3,273,974
FLUIDIZATION OF SINTERABLE FINES
John D. Gabor, Western Springs, Ill., and Manfred G. Baerns, Hannover, Germany, assignors to the United States of America as represented by the United States Atomic Energy Commission
No Drawing. Filed Oct. 11, 1965, Ser. No. 494,984
6 Claims. (Cl. 23—352)

The invention herein described was made in the course of, or under, a contract with the United States Atomic Energy Commission.

This invention relates to the fluidization of powder-like solids with gases. More particularly, this process relates to a method for applying fluid-bed technology to sinterable fines which tend to agglomerate and/or form channels.

The process of passing gas upwardly through a body of finely divided solid particles, causing the solid particles to assume fluid-like physical characteristics, is well known in the art. Some of the advantages to be obtained from applying this fluidized-bed concept are better heat transfer between the solids, rapid circulation of particles, and intimate contact between gas and solid. Although problems have arisen concerning one or more of the above or other nonenumerated advantages, solutions have been found which make fluidized-bed techniques applicable to many processes, such as catalytic cracking of petroleum oils, polymerization, and various reduction, oxidation, exothermic and endothermic reactions. Nevertheless, the art is not yet sufficiently developed to make the process operable in every case where the over-all advantages would be useful.

In the case where the bed material is composed of sinterable powders with particle diameters in the order of 4 to 40 microns, the methods presently available cannot be utilized to produce an efficient process with acceptable yields. The extent of fluidization, or the fluidizability, of any bed material depends in part upon the relationship between the interparticle adhesive force and the weight of the particles. As gas passes through a bed of particles a drag force is exerted on each particle. If the drag force is large enough to displace the particle from its position in the bed, the gas will tend to cut channels through the bed. This results because resistance encountered to gas flow through channels in the bed would be less than resistance to gas flow equally distributed around the particles of the bed. Gas will naturally tend to flow through the path of least resistance. These channels generally are instable and collapse after formation. When the interparticle adhesive force becomes large compared to the weight of the particle, the channels become stable and do not collapse immediately after their formation. Channel formation is undesirable because it inhibits heat transfer and intermixing between the particles and the gas. In addition, the channel walls become crusted with various reaction products and poor yields are obtained. Where the reaction between the gas and bed material is exothermic, large temperature differentials, in the order of several hundred degrees centigrade, may exist between the channel wall and the coolest part of the bed. As the temperatures increase, the particles tend to sinter, that is, melt at the edges and fuse, which results in large masses of agglomerated solids. When the presently available technology is used to fluidize and react sinterable powders in the order of 4 to 40 microns in diameter at temperatures of about 400–600° C. the powders agglomerate and fuse instead of fluidize; the reactant gas cuts channels through the fused bed and reaction products of non-uniform chemical compositions are formed.

Previously, work has been conducted for improving methods of mixing gases and solids. These methods generally depend upon a plurality of gas inputs to maintain several different bed velocities in the same reaction tank; however, these solutions would only result in a plurality of channels cut through a bed of sinterable fines, and the end result would still be insufficient contact between the reacting gas and solids. Some methods use mechanical dispersion means for obtaining greater distribution of the reactant gas; however, these methods would not be applicable to a high temperature process which uses extraordinarily corrosive gases. Various other schemes contained in the existing art are likewise inapplicable to the above-defined problems.

A method has now been discovered for fluidizing and reacting particles in the order of 4 to 40 microns in diameter which prevents agglomeration, sintering, and/or channeling and produces reaction products of substantially uniform chemical composition with acceptable yields. This method comprises a first step of fluidizing the sinterable powders with an inert gas to produce particle movement under conditions which prevent channeling, and a second step of reacting the sinterable powders with a reactant gas in a zone of particle agitation generated by the coalescense of inert gas bubbles.

Channeling in the bed is prevented by reducing the ratio of interparticle adhesive force to particle weight. This is accomplished in the present invention by mixing the reactant particles of 4 to 40 microns in diameter with inert particles of 100 to 1000 microns in diameter, which we have found renders the channels instable.

Much research and money have been expended to perfect systems which limit the size of or prevent the formation of bubbles in a fluidized bed. To this end, sintered metal distributors and various types of baffles have been extensively used. Sintering and agglomeration of a bed composed of sinterable powders is prevented in the present invention by a method contrary to accepted theory and practice in which large bubble formations, normally considered undesirable, are utilized to form a zone of agitation into which the reactant gas is introduced. The result of this two step system is a method for the fluidization and reaction of sinterable fines which is applicable even to exothermic reactions. To better understand the method, reference is made to the following examples. Fluid-bed apparatus suitable for use in these examples is well-known to those skilled in the art and comprises, in general, means for fluidizing a bed of material from the bottom and means for introducing reactant gas into the bed at any one of several levels above the bottom.

*Example I*

Uranosic oxide, $U_3O_8$, fines of about 4 to 20 microns in diameter were mixed with alumina, $Al_2O_3$, particles of about 200 to 300 microns in diameter to form a mixture that was 30 weight percent alumina. This mixture was used to form a bed 15 inches in depth. Nitrogen gas was introduced into the bottom of the bed at a velocity of 0.4 to 0.5 foot per second with respect to the cross-section of the bed. Minute bubbles of nitrogen formed at the point of introduction into the bed, and as the bubbles rose through the bed they expanded due to the decrease in pressure head from the bottom to the top of the bed. As the bubbles expanded and rose through the bed, they touched and coalesced into larger bubbles. Close to the bottom of the bed the particles were almost stagnant, but as the bubbles became larger, the bed particles became agitated. The zone in which the bed particles became agitated was readily observable by the operator. The bubbles, in this zone, were generally about 2 to 4 inches in diameter. This zone at the start of the run was about 9 inches from the bottom of the bed. Fluorine gas was introduced into the bed in this zone of agitation. While the reaction proceeded, the concentration of fines decreased, which brought about a small decrease in bed size. The decrease in fines concentration altered the fluid characteristics of the bed, so that the level of the zone of agitation moved lower. As the zone level dropped, the fluorine gas was introduced at successively lower levels which always coincided with the zone of agitation. The product, uranium hexafluoride, $UF_6$, volatilized from the fluidized bed as it was produced, and was recovered by condensation.

*Example II*

The same method was used as in Example I, except uranyl fluoride, $UO_2F_2$, fines of about 10 microns in diameter were mixed with alumina, $Al_2O_3$, to form a mixture 40 weight percent alumina. The bed depth was 4 feet, and the nitrogen gas velocity was 1.2 to 1.4 feet per second with respect to the cross-section of the bed. The zone of agitation formed initially about 2 feet from the bottom of the bed. The reaction product was uranium hexafluoride, $UF_6$, as in the above example.

The above examples are intended to be illustrative of the invention disclosed, but should not be construed as defining the limits of the invention; such is the purpose of the appended claims.

The embodiments of the invention in which an exclusive property or privilege is claimed are defined as follows:

1. A method of fluidizing and reacting sinterable fines, comprising, mixing said sinterable fines with inert particles larger than said sinterable fines to form a bed, introducing inert gas into said bed thereby fluidizing a lower portion of said bed and creating a zone of agitation in an upper portion of said bed, and introducing reaction gas into said fluidized bed at a level corresponding to the level of said zone of agitation.

2. The method of claim 1 where in the sinterable fines are about 4 to 40 microns in diameter.

3. The method of claim 2 wherein the inert particles are about 100 to 1000 microns in diameter.

4. The method of claim 3 wherein said reaction gas causes an exothermic reaction with said sinterable fines.

5. A method of fluidizing and reacting uranosic oxide fines of about 4 to 20 microns in diameter with fluorine gas to yield uranium hexafluoride, comprising: mixing said uranosic oxides fines with alumina particles of about 200 to 300 microns in diameter to form a bed of about 30 weight percent alumina, said bed being about 15 inches in depth; introducing nitrogen gas into said bed at a velocity of about 0.4 to 0.5 foot per second with respect to the cross-section of the bed, thereby fluidizing a lower portion of said bed and creating a zone of agitation in an upper portion of said bed about 9 inches from the bottom of said bed; and introducing fluorine gas into said fluidized bed at a level corresponding to the level of said zone of agitation.

6. A method of fluidizing and reacting uranyl fluoride fines of about 10 microns in diameter with fluorine gas to yield uranium hexafluoride, comprising: mixing said uranyl fluoride fines with alumina particles of about 200 to 300 microns in diameter to form a bed of about 40 weight percent alumina, said bed being about 4 feet in depth; introducing nitrogen gas into said bed at a velocity of about 1.2 to 1.4 feet per second with respect to the cross-section of the bed, thereby fluidizing a lower portion of said bed and creating a zone of agitation in an upper portion of said bed about 2 feet from the bottom of said bed, and introducing fluorine gas into said fluidized bed at a level corresponding to the level of said zone of agitation.

References Cited by the Examiner

UNITED STATES PATENTS

| | | | |
|---|---|---|---|
| 2,533,026 | 12/1950 | Matheson | 23—1 X |
| 3,164,440 | 12/1965 | Levey | 23—1 |

BENJAMIN R. PADGETT, *Acting Primary Examiner.*

S. TRAUB, *Assistant Examiner.*